United States Patent
Quednau et al.

(10) Patent No.: US 12,552,468 B2
(45) Date of Patent: Feb. 17, 2026

(54) DRIVER'S CAB FOR AN AGRICULTURAL WORK VEHICLE

(71) Applicant: CLAAS KGaA mbH, Harsewinkel (DE)

(72) Inventors: Alexander Quednau, Altbach (DE); Natalie Mildt, Altbach (DE); Markus Grevinga, Saerbeck (DE); Maximilian Bohl, Warendorf (DE); Thomas Wagner, Steinhagen (DE); Maximilian Groetsch, Warendorf (DE); Alain Blind, Warendorf (DE)

(73) Assignee: CLAAS KGaA mbH, Harsewinkel (DE)

( * ) Notice: Subject to any disclaimer, the term of this patent is extended or adjusted under 35 U.S.C. 154(b) by 0 days.

(21) Appl. No.: 18/931,339

(22) Filed: Oct. 30, 2024

(65) Prior Publication Data

US 2025/0136194 A1    May 1, 2025

(30) Foreign Application Priority Data

Oct. 30, 2023    (DE) .................... 10 2023 129 944.1

(51) Int. Cl.
*B62D 33/06* (2006.01)
*A01D 67/04* (2006.01)
(Continued)

(52) U.S. Cl.
CPC ............. *B62D 33/06* (2013.01); *A01D 67/04* (2013.01); *B60N 2/0226* (2023.08); *B60N 2/14* (2013.01);
(Continued)

(58) Field of Classification Search
CPC . B62D 33/06; B62D 1/12; B62D 2/24; A01D 67/04; B60N 2/0226; B60N 2/75;
(Continued)

(56) References Cited

U.S. PATENT DOCUMENTS 3,747,273 A * 7/1973 Johnson .................. E05C 17/24
49/394
4,392,546 A * 7/1983 Brown ............... B62D 33/0604
180/326
(Continued)

FOREIGN PATENT DOCUMENTS

CN      205100269 U       3/2016
EP       4151463 A1 *     3/2023  ............... B60N 2/38
(Continued)

OTHER PUBLICATIONS

Computer generated English translation of KR-20200080140 (Year: 2025).*
(Continued)

*Primary Examiner* — Paul N Dickson
*Assistant Examiner* — Tiffany L Webb
(74) *Attorney, Agent, or Firm* — Lempia Summerfield Katz LLC

(57) ABSTRACT

A driver's cab for an agricultural work vehicle. The driver's cab has a driver's seat on which armrests are arranged on both sides, a windshield delimiting the front of the driver's cab and extending substantially between the cab floor and cab roof of the driver's cab, and a steering unit replacement system. The steering unit replacement system comprises: steering elements at least integrated into the armrests positioned on both sides of the driver's seat, at least one footrest associated with the driver's seat at the front in an area close to the floor, at least one grab handle system arranged at the front, and at least one storage device accessible from the driver's seat by a driver in a sitting position.

20 Claims, 6 Drawing Sheets

(51) Int. Cl.
    *B60N 2/02*     (2006.01)
    *B60N 2/14*     (2006.01)
    *B60N 2/75*     (2018.01)
    *B60N 3/06*     (2006.01)
    *B62D 1/12*     (2006.01)

(52) U.S. Cl.
    CPC ............... *B60N 2/75* (2018.02); *B60N 3/06* (2013.01); *B62D 1/12* (2013.01)

(58) Field of Classification Search
    CPC . B60N 2/38; B60N 2/79; B60N 2/793; B60N 2/797; E02F 9/006
    See application file for complete search history.

(56) References Cited

U.S. PATENT DOCUMENTS

| | | | | |
|---|---|---|---|---|
| 5,504,974 A * | 4/1996 | Graber | | E05B 79/20 |
| | | | | 49/141 |
| 5,906,411 A * | 5/1999 | Stauffer | | B60N 2/3011 |
| | | | | 49/40 |
| 6,276,749 B1 * | 8/2001 | Okazawa | | B60N 2/14 |
| | | | | 296/65.01 |
| 6,942,282 B1 * | 9/2005 | Jacobs | | B62D 33/0617 |
| | | | | 296/190.08 |
| 7,971,677 B2 | 7/2011 | Ekren et al. | | |
| 9,816,251 B2 * | 11/2017 | Sasakawa | | E02F 3/76 |
| 9,963,084 B2 * | 5/2018 | Jacobsthal | | H04N 5/655 |
| 11,591,770 B2 * | 2/2023 | O'Halloran | | E02F 9/2004 |
| 2016/0130783 A1 | 5/2016 | Tolkacz et al. | | |
| 2021/0123210 A1 | 4/2021 | Ohalloran | | |
| 2023/0019973 A1 * | 1/2023 | Kosaki | | B60K 26/02 |

FOREIGN PATENT DOCUMENTS

| | | | | |
|---|---|---|---|---|
| JP | 10131235 A | * | 5/1998 | |
| JP | H10131235 A | | 5/1998 | |
| KR | 20180059567 A | * | 6/2018 | |
| KR | 20200080140 A | * | 7/2020 | ............ A01F 12/60 |
| WO | 2023144663 A1 | | 8/2023 | |

OTHER PUBLICATIONS

Computer generated English translation of JP 10131235 (Year: 2025).*
Computer generated English translation of KR 20180059567 (Year: 2025).*
Computer generated English translation of EP 4151463 (Year: 2025).*
International Search Report for International Application No. 24193506.3-1009 mailed on Feb. 6, 2025.

* cited by examiner

DRIVER'S CAB FOR AN AGRICULTURAL WORK VEHICLE

CROSS REFERENCE TO RELATED APPLICATION

This application claims priority under 35 U.S.C. § 119 to German Patent Application No. DE 10 2023 129 944.1 filed Oct. 30, 2023, the entire disclosure of which is hereby incorporated by reference herein. This application is related to U.S. application Ser. No. 18/931,344, which is incorporated by reference herein in its entirety.

TECHNICAL FIELD

The present invention relates to a driver's cab for an agricultural work vehicle and an agricultural work vehicle with a driver's cab.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

US Patent Application Publication No. 2021/0123210 A1 discloses a driver's cab for an agricultural work vehicle. The driver's cab has a driver's seat on which armrests are arranged on both sides, a windshield delimiting the front of the driver's cab and extending substantially between the cab floor and the cab roof of the driver's cab, and a steering unit replacement system. The steering unit replacement system comprises a joystick as an operating element for generating steering unit movements. The joystick is arranged on one of the armrests and may be pulled out of the armrest using a shuttle.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
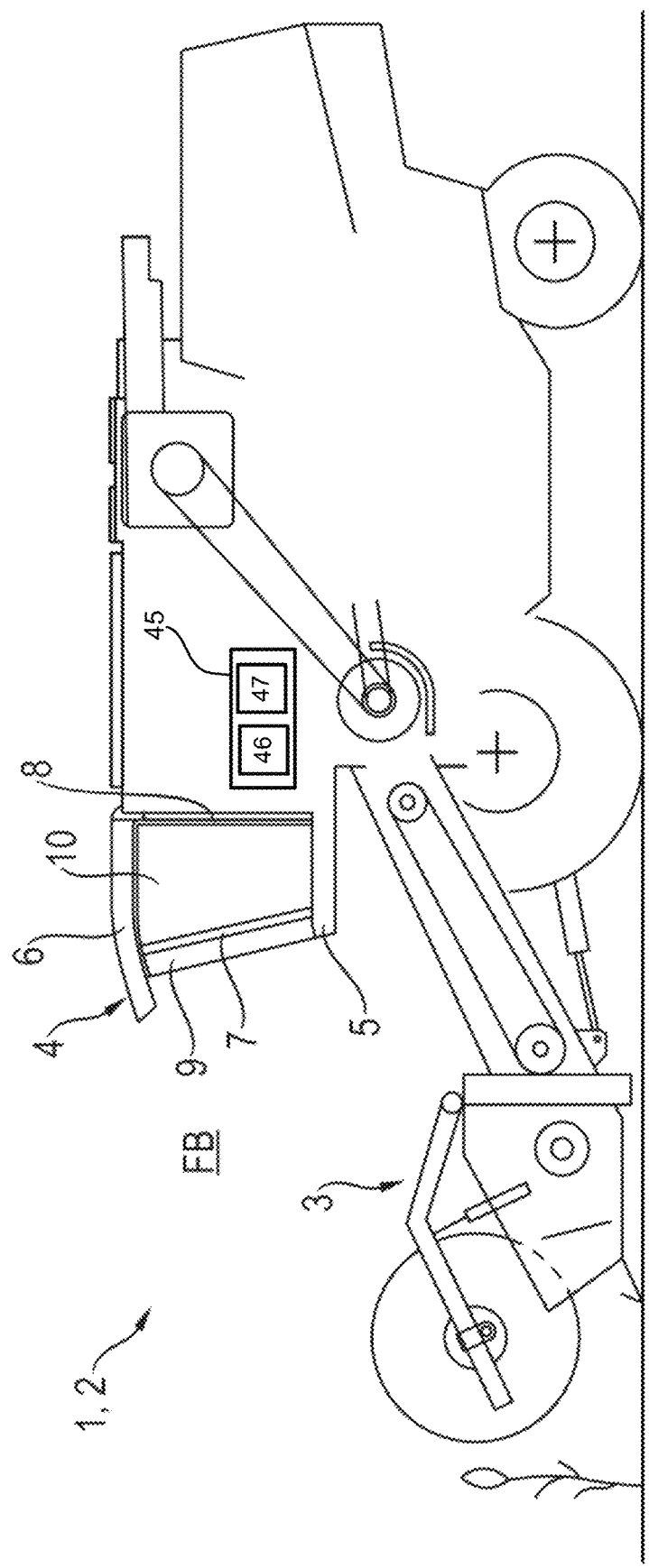
FIG. 1 illustrates a schematic example of an agricultural work vehicle designed as a harvester.

As discussed in the background, US Patent Application Publication No. 2021/0123210 A1 discloses driver's cab for an agricultural work vehicle. The work vehicle disclosed in US Patent Application Publication No. 2021/0123210 A1 is designed without a steering unit. In an embodiment of the work vehicle as a combine harvester, the steering unitless design means that the driver of the combine harvester may experience an unsafe feeling due to the large windshield designed at floor level since the large windshield gives the feeling that the driver could fall out of the front of the cab. In addition, due to the steering unitless design, there is nothing to hold on to when the driver leans forward to look into the front attachment of the combine harvester.

Against this backdrop, in one or some embodiments, a driver's cab for an agricultural work vehicle is disclosed that is a more user-friendly design in the interior of the driver's cab.

In one or some embodiments, a driver's cab for an agricultural work vehicle is disclosed that includes a driver's seat on which armrests are arranged or positioned on both sides (e.g., one of the plurality of armrests is positioned on one side of the driver's seat and another of the plurality of armrests is positioned on an opposite side of the driver's seat), a windshield delimiting the front of the driver's cab and extending at least partly or at least substantially (or entirely) between the cab floor and the cab roof of the driver's cab, and a steering unit replacement system. In one or some embodiments, the steering unit replacement system comprises:

steering elements at least integrated into the armrests positioned on both sides of the driver's seat;

at least one footrest positioned with respect to the driver's seat at the front of the driver's cab and positioned relative to the cab floor (e.g., at least one footrest associated with the front of the driver's seat in an area close to the cab floor);

at least one grab handle system arranged or positioned at the front; and at least one stowage device (e.g., storage device) accessible from the driver's seat by a driver in a sitting position.

In one or some embodiments, the driver's cab comprises an easy-to-operate steering unit replacement system, wherein the footrest and the grab handle system give the driver a safer driving feeling even without a steering wheel, while the area in front of the work vehicle is clearly visible.

The integration of a steering element in each of the armrests positioned on both sides of the driver's seat may have the advantage that the steering elements may be adaptively assigned different steering tasks by a control unit, which may vary for different types of work vehicles on which the driver's cab is used. The steering elements are part of a steer-by-wire steering system.

Improved comfort is achieved by means of at least one footrest located at the front of the driver's seat in the area near the floor. This may also promote a more ergonomic sitting posture for the driver. This also counteracts the feeling of insecurity caused by the large windshield designed at floor level.

The grab handle system arranged or positioned on at least one front side in front of the windshield enables the driver to lean forward in order to view a front attachment arranged or positioned on the work vehicle without having to lean against one of the A-pillars or the windshield itself.

At least one stowage device that may be reached from the driver's seat by the driver in the sitting position is advantageous from the point of view of comfort and safety.

In particular, the steering elements may be designed as a joystick or steering lever. Such steering elements enable intuitive handling. In addition, steering elements designed in this way may be characterized by an ergonomic shape, whereby continuous operation or continuous gripping of the steering elements is possible without fatigue.

Furthermore, the particular armrest may have a lower arm support surface which may be adjoined by a lower-lying section on which the particular at least one steering element is arranged or positioned. The arrangement of the at least one steering element on the lower-lying section of a respective armrest may be advantageous in terms of ergonomics during continuous actuation of the steering elements.

In particular, the footrest may be designed as at least one rail running substantially (e.g., at least 75%, at least 80% at least 90%, or at least 95%) in an arc that extends partially across the width of the windshield. In one or some embodiments, two rails are provided that run parallel to each other.

In one or some embodiments, the footrest may be arranged or positioned at least substantially in an L-shape, wherein a section of the at least one rail extends partially and substantially parallel to a longitudinal side of the driver's cab. In one or some embodiments, the section may run along the longitudinal side opposite an access to the driver's cab.

In one or some embodiments, the grab handle system may be designed as a rod-shaped component projecting at least partly or at least substantially (such as entirely) perpendicular to the cab floor with a handle element arranged or positioned at the free end, wherein the handle element is arranged or positioned substantially (e.g., at least 75%, at least 80% at least 90%, or at least 95%) centrally on and/or orthogonally to the component. In particular, the handle element may be designed substantially cylindrical, spherical or ellipsoidal in shape.

It is contemplated that the grab handle system may be transferred at least partially into a position substantially parallel to the cab floor. The grab handle system may have a joint element in the lower area of the rod-shaped component in order to position the grab handle system at least partially parallel to the cab floor (e.g., horizontally).

Alternatively or additionally, it is contemplated that the grab handle system may be moved along the footrest. This may allow the grab handle system to be moved to a position outside the viewing area of the windshield. In one or some embodiments, the grab handle system may be detachably fixed at different points on the at least one rail of the footrest. For this purpose, the grab handle system may have a fixing device at the bottom end of the bar-shaped or rod-shaped component.

In one or some embodiments, the at least one stowage device may be designed as any one, any combination, or all of: a compartment (alternatively termed a storage compartment); a holder; or a lockable storage space. For example, the arrangement of a compartment may be provided on the side next to the driver's seat, wherein the distance of the compartment is selected such that the driver sitting on the driver's seat may reach it by swiveling the driver's seat.

In particular, the storage space may have a cover that may be swiveled, such as swiveled around a swivel axis or a pivot axis, which may be unlocked and locked by a locking mechanism (e.g., a latch, fastener, spring lock, or the like).

Furthermore, the storage compartment may be designed with a user recognition device that is configured to unlock the locking mechanism. The locking mechanism may comprise a latch or a lock. In one or some embodiments, the user recognition device may comprise a fingerprint sensor or other type of biometric sensor. This may enable personalization of the access to the storage compartment. The fingerprint sensor may be integrated into a display element that is arranged or positioned on the storage compartment or on the cover that closes it.

In one or some embodiments, a telescopically-designed steering wheel may be arranged or positioned in the front area of the driver's cab. The telescopic steering wheel may be provided for road travel. The telescopic steering wheel may be part of the steer-by-wire steering system (e.g., a steering system without mechanical connection between the steering wheel and steering axle).

The telescopic steering wheel may be at least partly supported by or at least partly within, such as accommodated in, a holding device that may be moved along the footrest or arranged or positioned on the cab floor. In this case, the telescopic steering wheel may be moved along the footrest out of the area of the windshield, which may give the driver a more uninterrupted view in the direction of forward travel.

In one or some embodiments, the driver's seat may be pivoted about a vertical axis, wherein an actuator system rotating the driver's seat is provided which may be controlled by a control device in order to automatically pivot the driver's seat from a road driving position, in which the driver's seat is oriented with its seat surface front edge substantially parallel to the windshield, into a position facing an access area (or other defined area) of the driver's cab upon detection of entry into and/or exit from the driver's cab. The actuator system may comprise an electric motor. To this end, the control device may be configured to automatically detect the unlocking or opening of an access door to the driver's cab as the entry by the driver. Responsive to automatically detecting the unlocking or opening of an access door to the driver's cab as the entry by the driver, the control device may automatically send one or more commands to the actuator system in order to automatically control the pivoting of the driver's seat.

In one or some embodiments, an agricultural work vehicle with a driver's cab is disclosed, wherein the driver's cab is designed according to any teaching described herein.

Referring to the figures, FIG. 1 illustrates a schematic example of an agricultural work vehicle 1, which may comprise a harvester 2. The harvester 2 may be a combine harvester or forage harvester. The agricultural work vehicle 1 may also be designed as a tractor. The harvester 2 may comprise a front attachment 3 as the attachment, which may be arranged or positioned in the front area FB below a driver's cab 4. The driver's cab 4 may comprise a cab frame 11 with a frame structure 12 which has a plurality of A-pillars, such as two A-pillars 7, provided in its front area FB and a plurality of B-pillars 8, such as two B-pillars 8, arranged or positioned at a distance therefrom. The driver's cab 4 may have a windshield 9 extending between the A-pillars 7, which may extend substantially between the cab floor 5 and the cab roof 6 of the driver's cab 4. Between a pair of the A-pillars 7 and the B-pillars 8 there may be an access area 10 which may be bounded by a door with a transparent side window at floor level.

Figure 2:
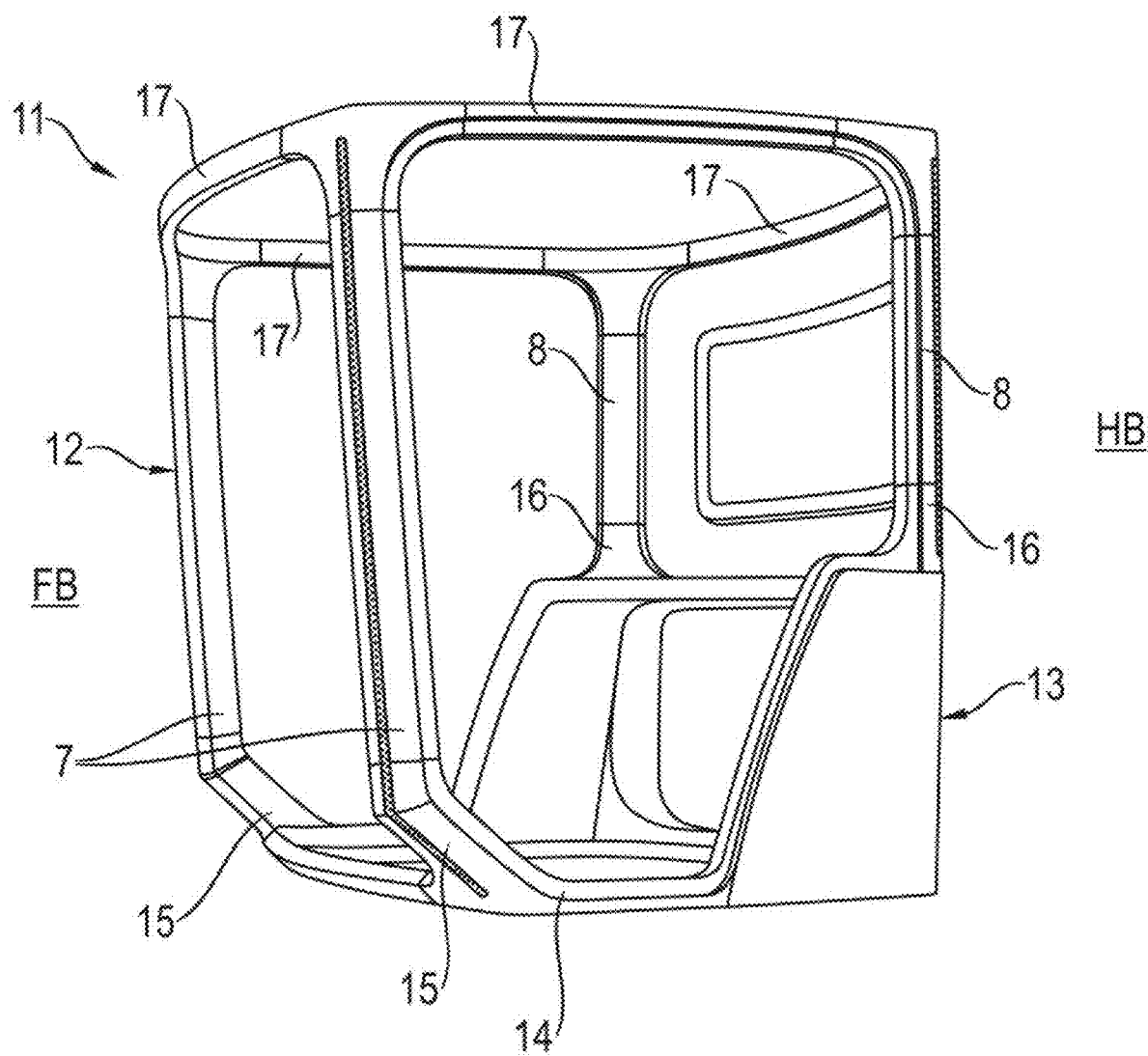
FIG. 2 illustrates a schematic example of a perspective view of a cab frame of a driver's cab of the agricultural work vehicle.

FIG. 2 illustrates a schematic perspective view of a cab frame 11 of the driver's cab 4 for the work vehicle 1 designed as a harvester 2. The driver's cab 4 may comprise the cab frame 11 with a frame structure 12. Furthermore, the cab frame 11 may comprise a base element 13. The base element 13 may be part of the cab floor 5. The frame structure 12 of the cab frame 11 may be designed cross-system so that it is used in the different embodiments of work vehicles 1. The base element 13 according to the embodiment of the cab frame 11 shown in FIG. 2 may differ only in the aspects specific to the particular work vehicle 1.

In the work vehicle 1 designed as a harvester 2, the base element 13 shown in FIG. 2 may have an inclination of two front-side pillar sections 15 in the front area FB rising from the floor section 14 of the base element 13. The pillar sections 15 may serve to connect the substantially vertically extending A-pillars 7 of the frame structure 12 to the base element 13. The inclination of the pillar sections 15 may enable a person in the driver's cab 4 to see the area directly in front of and below the driver's cab 4, which may be necessary and useful for the work vehicle 1 designed as a harvester 2. The two B-pillars 8 may be located in the rear area HB of the driver's cab 4 or the cab frame 11. The two B-pillars 8 may be connected by pillar sections 16 in the rear area HB of the base element 13.

The A-pillars 7 and the B-pillars 8 may be connected to each other at their ends by frame segments 17 extending in the longitudinal direction and in the transverse direction of the driver's cab 4 as components of the frame structure 12. The two A-pillars 7 and the two B-pillars 8 may be arranged or positioned running substantially vertically and accommodate the cab roof 6 which may close off the driver's cab 4 at the top.

The free areas within the frame structure 12 between the two A-pillars 7 and the B-pillars 8 as well as between the A-pillars 7 and the B-pillars 8 of the cab frame 11 may be completely closed by the windshield 9 and side windows. The side windows may not have any additional frame elements that restrict the free view out of the driver's cab 4, in particular to the front and to the side.

Figure 3:
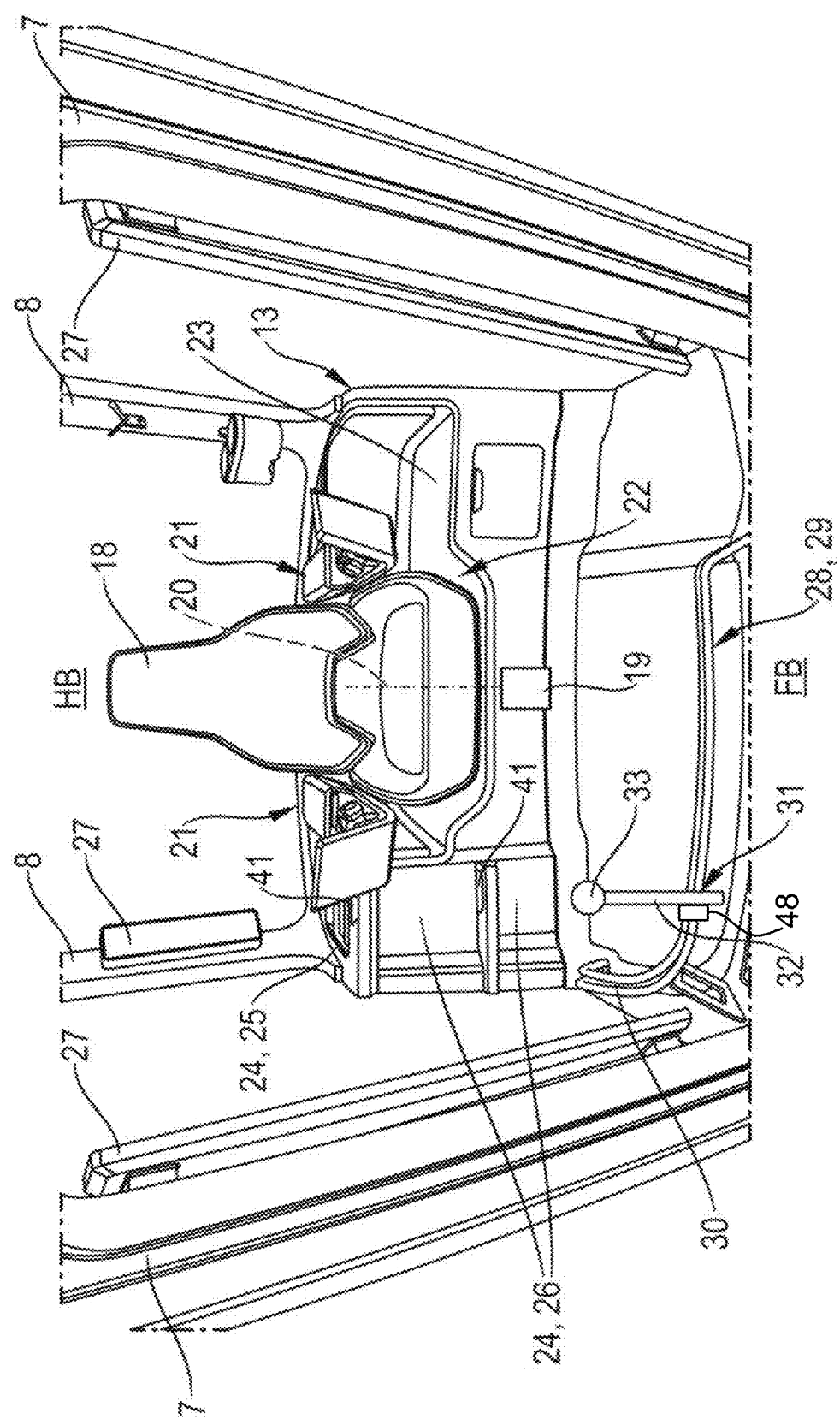
FIG. 3 illustrates a schematic example of a partial perspective view of a driver's cab from the front.

FIG. 3 illustrates a schematic perspective partial view of the driver's cab 4 from the front. A driver's seat 18 is arranged or positioned on the base element 13 in a shaped area 22 of the base element 13. The driver's seat 18 is configured to pivot about a vertical axis 20. A plurality of armrests 21 may be arranged or positioned on both sides of the driver's seat 18 (e.g., one armrest 21 on the left side of the driver's seat 18 and a second armrest 21 on the right side of the driver's seat). The driver's seat 18 may be designed in such a way that the driver is supported in the manner of a car backrest. So that the driver may nevertheless look backwards, the driver's seat 18 may be rotated about the vertical axis 20 to such an extent that the driver may see the rear area with a slight head movement to the right or left, such as in order to be able to see coupling elements in the rear area of a work vehicle 1 designed as a tractor. For this purpose, it is furthermore provided that a rear window between the B-pillars 8 may also be opened. The driver's seat 18 may be designed to be ventilated in the area of a headrest. Depending on the time of use, this may allow the head area to be warmed or cooled using a stream of air exiting from an opening in the area of the headrest. The driver's seat 18 may be pivoted about the vertical axis 20 using an actuator system 19, such as by an electric motor. For this purpose, the actuator system 19 may be engaged by means of an engageable clutch.

The actuator system 19, which is configured to rotate the driver's seat 18, may be controlled by a control device 45 in order to automatically pivot the driver's seat 18 from a road driving position, in which the driver's seat 18 is oriented with its seat surface front edge substantially parallel to the windshield 9, into a position facing an access area 10 of the driver's cab 4 upon detection (such as at least partly automatic detection based on operator input (such as a switch input) or fully automatic detection (such as based on image analysis of images generated by a camera)) of entry into or exit from the driver's cab 4. This may allow entering or leaving the driver's cab 4 to be configured to be more comfortable.

Control device 45 may include at least one processor 46 and at least one memory 47. The at least one processor 46 and at least one memory 47 may be in communication (e.g., wired and/or wirelessly) with one another. In one or some embodiments, the processor 46 may comprise a microprocessor, controller, PLA, or the like. Similarly, the memory 47 may comprise any type of storage device (e.g., any type of memory). Though the processor 46 and the memory 47 are depicted as separate elements, they may be part of a single machine, which includes a microprocessor (or other type of controller) and a memory. Alternatively, the processor 46 may rely on the memory 47 for all of its memory needs. The memory 47 may comprise a tangible computer-readable medium that include software that, when executed by the processor 46 is configured to perform any one, any combination, or all of the functionality described herein, such as the functionality of the assistance system.

The processor 46 and the memory 47 are merely one example of a computational configuration for the control device 45. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In addition to the driver's seat 18, a passenger seat 23 may be formed in the base element 13 on the side of the base element 13 facing the access area 10. At least one stowage device 24 is located on the side opposite the passenger seat 23. The at least one stowage device 24 may be designed as a storage surface 25 and may be formed as a recess on the upper side of the base element 13. At least one further stowage device 24 may be designed as a lockable storage compartment 26. The at least one stowage device 24 may be reached by a driver in a sitting position from the driver's seat 18 without having to leave it.

Furthermore, the storage compartment 26 may be designed with a user recognition device 41. In one or some embodiments, the user recognition device 41 may be designed as a fingerprint sensor or other biometric-type sensor. This may enable personalization of access to the storage compartment 26. The fingerprint sensor may be integrated into a display element that is arranged or positioned on the storage compartment 26 or on the cover that closes it.

Furthermore, visualization devices 27 may be arranged or positioned on the A-pillars 7 and/or the B-pillars 8 on their sides facing the interior of the driver's cab 4. The visualization devices 27 may completely or partially cover the particular A-pillar 7 and/or B-pillar 8. The visualization devices 27 may comprise cameras and displays, with the cameras capturing images of the viewing area outside the driver's cab 4 that is covered by the A-pillars 7 and/or B-pillars 8 and transmitting the images for output on the displays of the visualization devices 27. In this way, a substantially uninterrupted or interference-free view out of the driver's cab 4 is made possible. The field of vision obscured by the A-pillars 7 and/or the B-pillars 8 may be recorded by cameras arranged or positioned on the driver's cab 4 and reproduced on the visualization devices 27. In the embodiment shown in FIG. 3, visualization devices 27 are arranged or positioned on the two A-pillars 7 and at least one of the B-pillars 8. In addition, the visualization devices 27 may serve to display information about the work vehicle 1 or the attachment arranged or positioned thereupon.

In front of the windshield 9, at least one footrest 28 assigned to the driver's seat 18 may be arranged or positioned in front in an area close to the floor. The footrest 28 may be designed as at least one rail 29 running substantially in an arc which may extend at least partially (or entirely) across the width of the windshield 9.

The footrest 28 may be arranged or positioned substantially in an L-shape on the cab floor 5, wherein a section 30 of the rail 29 extends partially and substantially parallel to a longitudinal side of the driver's cab 4.

Furthermore, at least one grab handle system 31 arranged or positioned at the front before the windshield 9 is provided. The grab handle system 31 may be designed as a rod-shaped component 32 projecting substantially perpendicular to the cab floor 5 with a handle element 33 arranged or positioned at the free end, wherein the handle element 33 may be arranged or positioned substantially centrally on and/or orthogonally to the rod-shaped component 32 on the latter. It is contemplated that the grab handle system 31 may be transferred, at least partially, into a position substantially parallel to the cab floor 5 (e.g., in a substantially lying, prone, or flat position). Alternatively, the grab handle system 31 may be displaceable along the footrest 28 or the at least one rail 29. This may allow the grab handle system 31 to be moved into a position outside the viewing area of the windshield 9. The grab handle system 31 may be fixed at different points on the at least one rail 29. For this purpose, a fixing device 48 may be arranged or positioned at the bottom end of the rod-shaped component 32, which may have a locking and unlocking mechanism. Various fixing devices 48 are contemplated. As one example, fixing device 48 may comprise a latch or the like. This may allow the grab handle system 31 to be positioned anywhere along the footrest 28.

Figure 4:
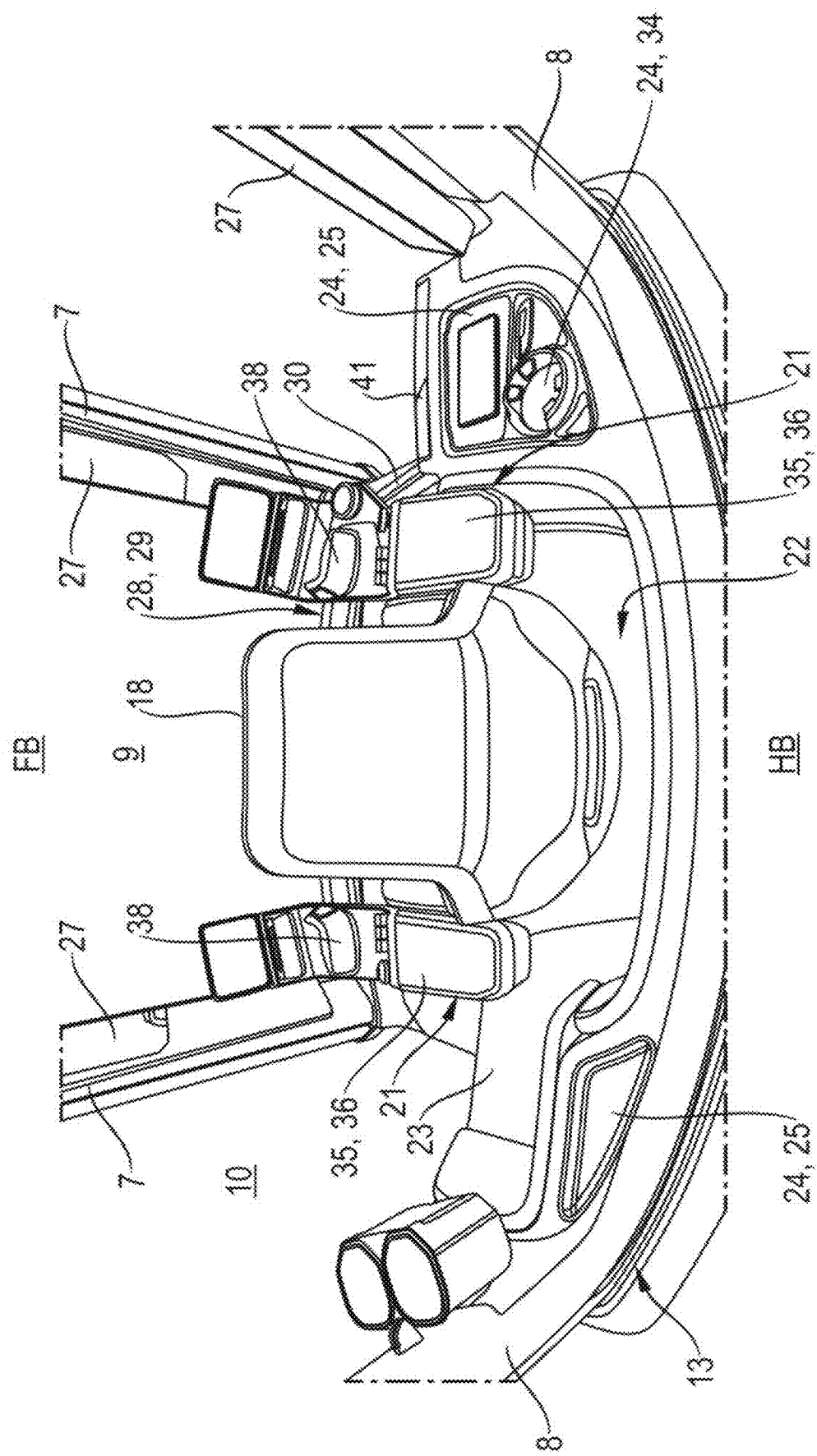
FIG. 4 illustrates a schematic example of a partial perspective view of the driver's cab according to FIG. 3 from the rear.

FIG. 4 shows a schematic of a partial perspective view of the driver's cab 4 according to FIG. 3 from the rear. The at least one stowage device 24 may also be designed as a holder 34. In the illustrated embodiment, the holder 34 may be integrated into the storage surface 25.

Furthermore, the illustration according to FIG. 4 depicts the two armrests 21, which may be arranged or positioned on both sides of the driver's seat 18. The armrests 21 may have a section 35 which, starting from the driver's seat 18, extends substantially in a horizontal direction. The section 35 may form a lower arm support surface 36, which may be adjoined by a lower section 37, which may also extend in a substantially horizontal direction. At least one steering element 38 integrated into the armrest 21 may be arranged or positioned on the lower-lying section 37. The particular steering element 38 may be designed as a joystick or steering lever. The steering elements 38 may be part of a steer-by-wire steering system.

Figure 5:
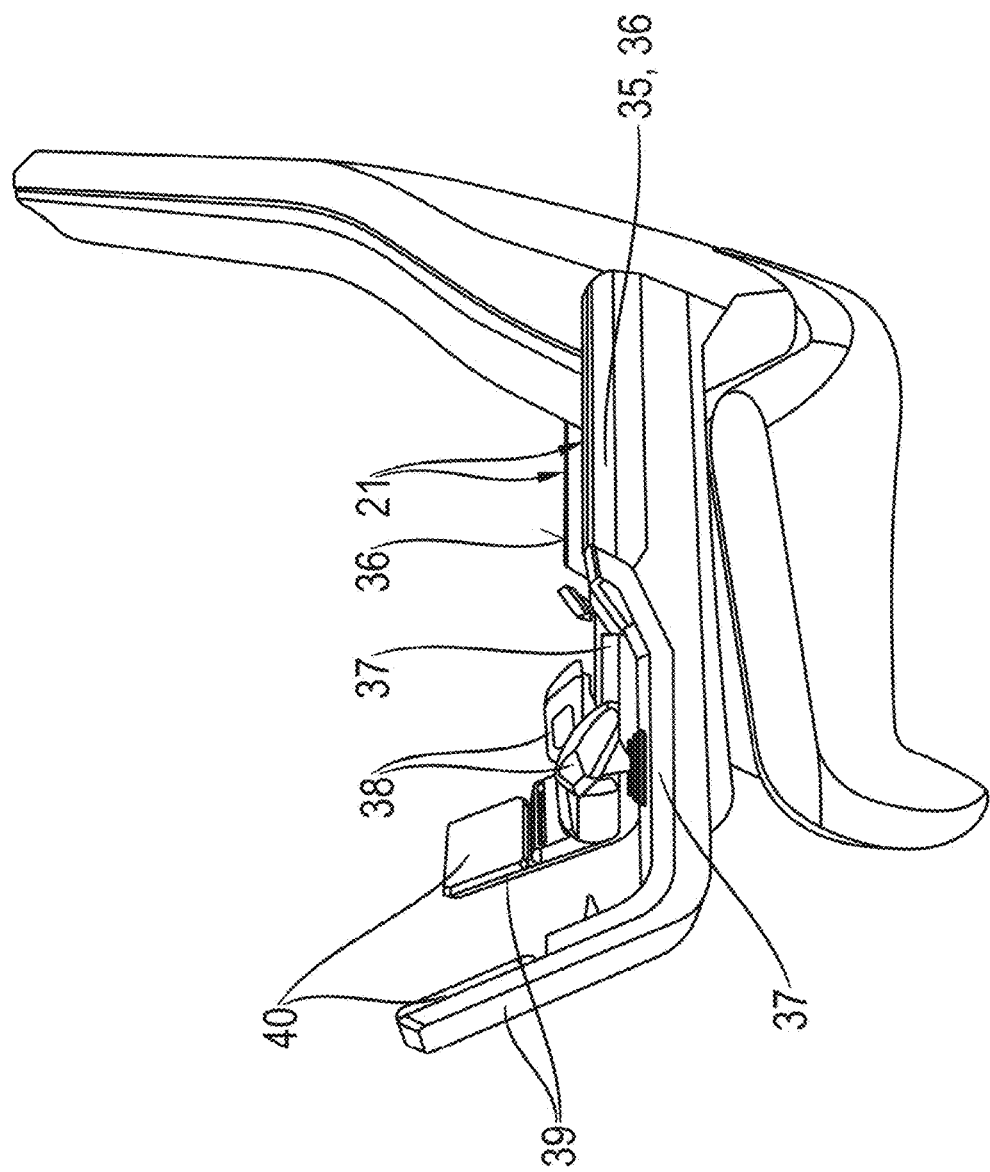
FIG. 5 illustrates a schematic example of a side view of a driver's seat.

The lower section 37 may be adjoined by another section 39 of the respective armrest 21 which, inclined at an angle, may extend partially in a vertical direction, as shown in FIG. 5. A display element 40 may be arranged or positioned at the free end of the section 39 of the particular armrest 21. In addition, further operating elements may be arranged or positioned on this section 39.

A telescopically-designed steering wheel 42 may be arranged or positioned in the front area of the driver's cab 4. The telescopic steering wheel 42 may be part of the steer-by-wire steering system of the work vehicle 1. The telescopic steering wheel 42 may be accommodated in a holding device 43, which may be moved along the footrest 28 designed as at least one rail 29, or may be arranged or positioned on the cab floor 5.

Figure 6B:
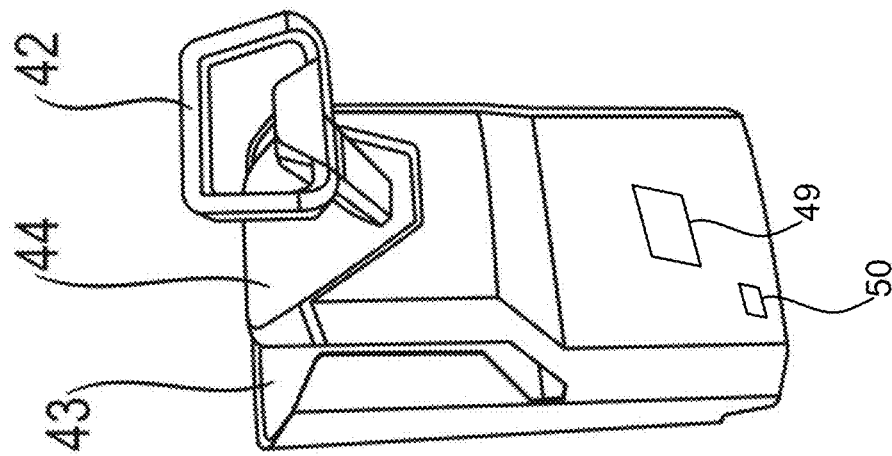
FIG. 6B illustrates a schematic example of a perspective view of the steering wheel according to FIG. 6A in an operating position.
Figure 6A:
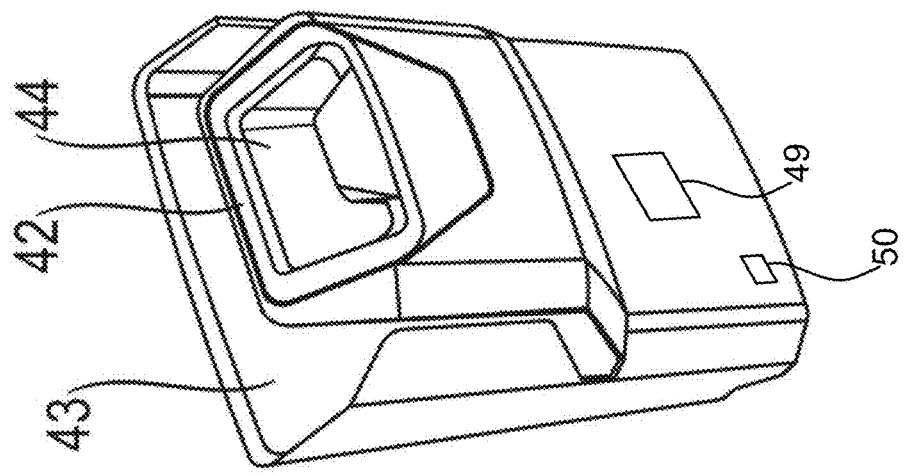
FIG. 6A illustrates a schematic example of a perspective view of a holding device for a telescopically-designed steering wheel in a stowed position.

FIG. 6A shows a schematic of a perspective view of a holding device 43 for the telescopically-designed steering wheel 42 in a stowed position. In the stowed position, the steering wheel 42 may be located in a receiving recess 44 in the holding device 43. In this case, the steering wheel 42 may be substantially flush with the wall sections surrounding the edge of the receiving recess 44.

FIG. 6B shows a schematic of a perspective view of the steering wheel 42 according to FIG. 6A in an operating position. The telescopic steering wheel 42 may protrude from the holding device 43. The telescopic steering wheel 42 may be extended, such as by motor 49, to assume the operating position. In one or some embodiments, motor 49 may be controlled via a touch-screen display in communication (e.g., wired and/or wirelessly) with control device 45. Motor 49 may be positioned within a housing of the holding device 43.

The telescopic steering wheel 42 may be used for road travel. In particular, work vehicles 1 designed as harvesters 2 may have a so-called road travel switch 50. The automatic detection of the actuation of the road travel switch by the control device 45 may be used for the control device 45 to automatically control motor 49 to automatically extend the telescopic steering wheel 42 for road travel or to automatically retract the telescopic steering wheel 42 in a change of state of the road travel switch 50 to field travel.

The driver's cab 4 may have a steering unit replacement system that allows the steering of the work vehicle 1 without the steering wheel 42. The steering unit replacement system of the work vehicle 1 may comprise any one, any combination, or all of: the steering elements 38 at least integrated in the armrests 21 positioned on both sides of the driver's seat 18; the at least one footrest 28 associated with the front of the driver's seat 18 in an area close to the cab floor; the at least one grab handle system 31 arranged or positioned on the front; and the at least one stowage device 24 accessible from the driver's seat 18 by a driver in a sitting position.

In one or some embodiments, the steering unit replacement system may be easy to operate, wherein the driver may be given a safe driving feeling when actuating the steering elements 38 by the footrest 28 and the grab handle system 31, and the area in front of the work vehicle 1 may be clearly visible. The possibility for the driver to rest his feet on the footrest 28 may counteract the feeling of insecurity that may arise with the large windshield. By allowing the driver to lean on the grab handle system 31 while leaning forward towards the windshield 9, the area in front of the work vehicle 1 may be clearly visible.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

| List of Reference Numbers | |
|---|---|
| 1 | Work vehicle |
| 2 | Harvester |
| 3 | Front attachment |
| 4 | Driver's cab |
| 5 | Cab floor |
| 6 | Cab roof |
| 7 | A-pillar |
| 8 | B-pillar |
| 9 | Windshield |
| 10 | Access area |
| 11 | Cab frame |
| 12 | Frame structure |
| 13 | Base element |
| 14 | Floor section |
| 15 | Pillar section |
| 16 | Pillar section |
| 17 | Frame segment |
| 18 | Driver's seat |
| 19 | Actuator |
| 20 | Vertical axis |
| 21 | Armrest |
| 22 | Area of 13 |
| 23 | Passenger seat |
| 24 | Stowing device |
| 25 | Storage surface |
| 26 | Storage compartment |
| 27 | Visualization device |
| 28 | Footrest |
| 29 | Rail |
| 30 | Section of 29 |
| 31 | Grab handle system |
| 32 | Rod-shaped component |
| 33 | Handle element |
| 34 | Holder |
| 35 | First section |
| 36 | Lower arm support surface |
| 37 | Lower section |
| 38 | Steering element |
| 39 | Section |
| 40 | Display element |
| 41 | User recognition device |
| 42 | Steering wheel |
| 43 | Holding device |
| 44 | Receiving recess |
| 45 | Control device |
| 46 | Processor |
| 47 | Memory |
| 48 | Fixing device |
| 49 | Motor |
| 50 | Switch |
| FB | Front area |
| HB | Rear area |

The invention claimed is:

1. A driver's cab for an agricultural work vehicle, the driver's cab comprising:
   a cab floor;
   a cab roof;
   a driver's seat;
   a plurality of armrests, wherein one of the plurality of armrests is positioned on one side of the driver's seat and another of the plurality of armrests is positioned on an opposite side of the driver's seat;
   a windshield configured to delimit a front of the driver's cab and extending at least partly between the cab floor and the cab roof of the driver's cab; and
   a steering unit replacement system comprising:
      steering elements at least partly integrated into the armrests positioned on both sides of the driver's seat;
      at least one footrest positioned substantially in a L-shape and positioned with respect to the driver's seat at the front of the driver's cab and positioned relative to the cab floor, wherein the at least one footrest comprises at least one rail running substantially in an arc and extending at least partially over a width of the windshield, wherein a section of the at least one rail extends at least partially and substantially parallel to a longitudinal side of the driver's cab;
      at least one grab handle system positioned at the front of the driver's cab; and
      at least one stowage device accessible from the driver's seat by a driver in a sitting position.

2. The driver's cab of claim 1, wherein the steering elements comprise a joystick or steering lever.

3. The driver's cab of claim 1, wherein at least one of the plurality of armrests has a lower arm support surface which is adjoined by a lower-lying section on which a respective steering element is positioned.

4. The driver's cab of claim 1, wherein the grab handle system comprises a rod-shaped component projecting at least substantially perpendicularly to the cab floor with a handle element positioned at a free end; and
   wherein the handle element is positioned one or both of substantially centrally on or orthogonally to the rod-shaped component.

5. The driver's cab of claim 1, wherein the at least one stowage device comprises at least one of a storage compartment, a holder, or a lockable stowage compartment.

6. The driver's cab of claim 5, wherein the storage compartment includes a cover configured to pivot about a pivot axis and includes a locking mechanism configured for unlocking and locking.

7. The driver's cab of claim 6, wherein the storage compartment comprises a user recognition device configured to unlock the locking mechanism.

8. The driver's cab of claim 1, wherein the at least one stowage device comprises a compartment, a holder, and a lockable stowage compartment.

9. The driver's cab of claim 1, further comprising a telescopically-designed steering wheel positioned in a front area of the driver's cab.

10. The driver's cab of claim 9, wherein the telescopically-designed steering wheel is at least partly supported by or at least partly within a holding device configured to move along the at least one footrest or is positioned on the cab floor.

11. The driver's cab of claim 9, wherein the telescopically-designed steering wheel is positioned on the cab floor.

12. The driver's cab of claim 9, wherein the driver's seat is configured to pivot about a vertical axis; and
   further comprising:
      an actuator system configured to rotate the driver's seat; and
      a control device in communication with the actuator system and configured to:
         detect at least one of an entry of an operator into the driver's cab or an exit of the operator from the driver's cab; and
         responsive to detecting at least one of the entry of the operator into the driver's cab or the exit of the operator from the driver's cab, automatically control the actuator system in order to automatically pivot the driver's seat from a road driving position, in which the driver's seat is oriented with a seat surface front edge of the driver's seat substantially parallel to the windshield, into a position facing an access area of the driver's cab.

13. A driver's cab, for an agricultural work vehicle, the driver's cab comprising:
   a cab floor;
   a cab roof;
   a driver's seat;
   a plurality of armrests, wherein one of the plurality of armrests is positioned on one side of the driver's seat and another of the plurality of armrests is positioned on an opposite side of the driver's seat;
   a windshield configured to delimit a front of the driver's cab and extending at least partly between the cab floor and the cab roof of the driver's cab; and
   a steering unit replacement system comprising:
      steering elements at least partly integrated into the armrests positioned on both sides of the driver's seat;
      at least one footrest positioned with respect to the driver's seat at the front of the driver's cab and positioned relative to the cab floor;
      at least one grab handle system positioned at the front of the driver's cab, wherein the at least one grab handle system comprises a rod-shaped component projecting at least substantially perpendicularly to the cab floor with a handle element positioned at a free end, wherein the handle element is positioned one or both of substantially centrally on or orthogonally to the rod-shaped component; and
      at least one stowage device accessible from the driver's seat by a driver in a sitting position;
   wherein the grab handle system is configured to be transferred at least partially into a position substantially parallel to the cab floor.

14. The driver's cab of claim 13, wherein the grab handle system is configured to be displaced along the at least one footrest.

15. An agricultural work vehicle comprising:
   a driver's cab comprising:
      a cab floor;
      a cab roof;
      a driver's seat;
      a plurality of armrests, wherein one of the plurality of armrests is positioned on one side of the driver's seat and another of the plurality of armrests is positioned on an opposite side of the driver's seat;
      a windshield configured to delimit a front of the driver's cab and extending at least partly between the cab floor and the cab roof of the driver's cab;
      a telescopically-designed steering wheel positioned in a front area of the driver's cab; and
      a steering unit replacement system comprising:
         steering elements at least partly integrated into the armrests positioned on both sides of the driver's seat;
         at least one footrest positioned with respect to the driver's seat at the front of the driver's cab and positioned relative to the cab floor;
         at least one grab handle system positioned at the front of the driver's cab; and
         at least one stowage device accessible from the driver's seat by a driver in a sitting position.

16. The agricultural work vehicle of claim 15, wherein the telescopically-designed steering wheel is at least partly supported by or at least partly within a holding device configured to move along the at least one footrest or is positioned on the cab floor.

17. The agricultural work vehicle of claim 15, wherein the driver's seat is configured to pivot about a vertical axis; and further comprising:
   an actuator system configured to rotate the driver's seat; and
   a control device in communication with the actuator system and configured to:
      detect at least one of an entry of an operator into the driver's cab or an exit of the operator from the driver's cab; and
      responsive to detecting at least one of the entry of the operator into the driver's cab or the exit of the operator from the driver's cab, automatically control the actuator system in order to automatically pivot the driver's seat from a road driving position, in which the driver's seat is oriented with a seat surface front edge of the driver's seat substantially parallel to the windshield, into a position facing an access area of the driver's cab.

18. The agricultural work vehicle of claim 15, wherein the telescopically-designed steering wheel is positioned on the cab floor.

19. The agricultural work vehicle of claim 15, wherein the at least one footrest comprises at least one rail running substantially in an arc and extending at least partially over a width of the windshield;
   wherein the at least one footrest is positioned substantially in a L-shape; and
   wherein a section of the at least one rail extends at least partially and substantially parallel to a longitudinal side of the driver's cab.

20. The agricultural work vehicle of claim 15, wherein the grab handle system comprises a rod-shaped component projecting at least substantially perpendicularly to the cab floor with a handle element positioned at a free end;
   wherein the handle element is positioned one or both of substantially centrally on or orthogonally to the rod-shaped component; and
   wherein the grab handle system is configured to be transferred at least partially into a position substantially parallel to the cab floor.

* * * * *